Figure 1:
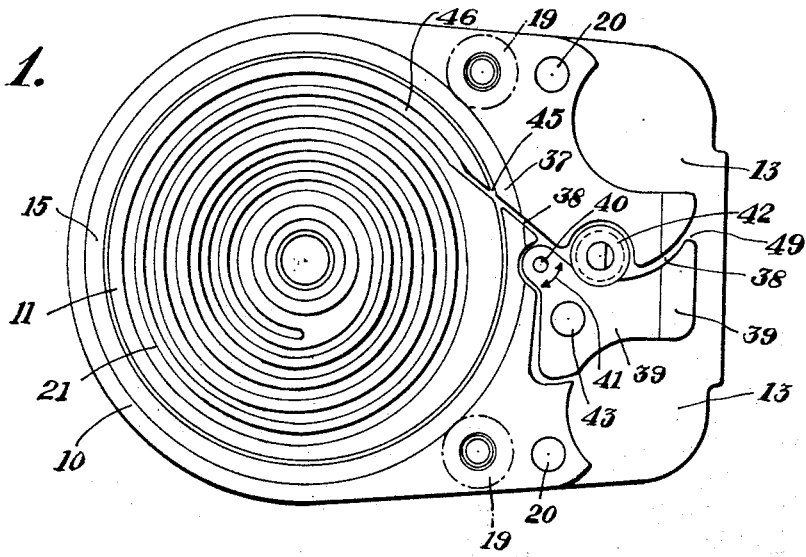

Oct. 3, 1944.  J. BOLSEY  2,359,611
FILM DEVELOPER
Filed July 9, 1943  2 Sheets-Sheet 1

INVENTOR:
Jacques Bolsey
BY
his agent

Oct. 3, 1944.  J. BOLSEY  2,359,611
FILM DEVELOPER
Filed July 9, 1943  2 Sheets-Sheet 2

INVENTOR:
Jacques Bolsey
BY
his agent

Patented Oct. 3, 1944

2,359,611

UNITED STATES PATENT OFFICE 2,359,611

FILM DEVELOPER

Jacques Bolsey, New York, N. Y.

Application July 9, 1943, Serial No. 494,047

14 Claims. (Cl. 95—90.5)

My present invention relates to apparatus for developing photographic films and more particularly to a daylight loading developer.

It is an object of my present invention to provide a film developer which is simple and inexpensive in construction and which can be quickly and easily loaded and operated in daylight.

It is another object of my present invention to provide a film developer into which the developing liquid can be poured easily and removed without difficulty.

Still another object of my present invention consists of a developing device in which the film does not get into contact with the developing solution during loading.

It is a further object of my present invention to provide a developing tank with separate film receiving and film developing compartments.

Still a further object of my invention consists in means for introducing the film to be developed from a film magazine into the film developer without admitting light to the film compartments within the developer.

With the above objects in view, my present invention mainly consists of a film developer comprising a film receiving and a film developing compartment, an opening connecting these compartments, and a film supporting reel being rotatable about its axis and being constructed and arranged in such a manner as to be adapted to be moved in direction of this axis through the above mentioned opening from one of the compartments into the other and back. Manually operated means should be provided for sliding this film supporting reel from the outside in axial direction through the opening, whenever required. In this way, it is possible to introduce the exposed film to be developed into the film receiving compartment through a film receiving slot arranged in this compartment, to arrange it in form of a spiral on the film supporting reel and then to slide this reel together with the film into the film developing compartment, to develop it there, and to move it back together with the reel into the film receiving compartment.

Preferably, both the film receiving and the film developing compartments are cylindrical and arranged coaxially superimposed upon each other; in this case, the film receiving slot is arranged parallel to the common axis of these superimposed cylindrical compartments in the film receiving compartment and is constructed in such a manner as to prevent light from reaching both these compartments.

It is preferable but not absolutely necessary that these film compartments and the film supporting reel be constructed and shaped so that the compartments are entirely or at least almost fluid-tightly shut off from each other by the film reel when the same is in one of its operative positions, i. e. in film receiving position in the film receiving compartment or in film developing position in the film developing compartment. Of course, it is possible to limit this fluid-tight separation to one of the above operative positions of the film supporting reel, namely to construct and arrange the compartments and the reel in such a manner that they are fluid-tightly shut off from each other only in one of the operative positions of the film reel and connected with each other in the other operative position.

Of course, I provide on the film reel means for guiding the film, e. g. a spiral groove, so that during treatment the film to be developed will be in the required position with the single film windings spaced apart from each other. In this case, it is also advisable to provide means for holding the film supporting reel non-rotatably about its axis with the outer end of this spiral groove positioned opposite the film receiving slot in the film receiving compartment, when the reel is in film receiving position.

A preferred embodiment of my present invention comprises a housing provided with three compartments, namely a closed film receiving compartment, a closed film developing compartment, and an open film magazine compartment; this latter compartment serves for housing the film magazine containing the film to be developed and is connected by a film receiving channel with the closed film receiving compartment for introducing the film from the film magazine arranged in the open magazine compartment into the closed film receiving compartment, when required.

The closed film receiving and film developing compartments are preferably of cylindrical shape and are arranged co-axially superimposed upon each other, as described above. The open film magazine compartment is preferably arranged adjacent to and on the same level with the closed film receiving compartment. A film transporting sprocket reaches into the film receiving channel connecting the open film magazine compartment with the closed film receiving compartment so as to be adapted to move the film through this channel from the film magazine into the film receiving compartment.

Figure 2:
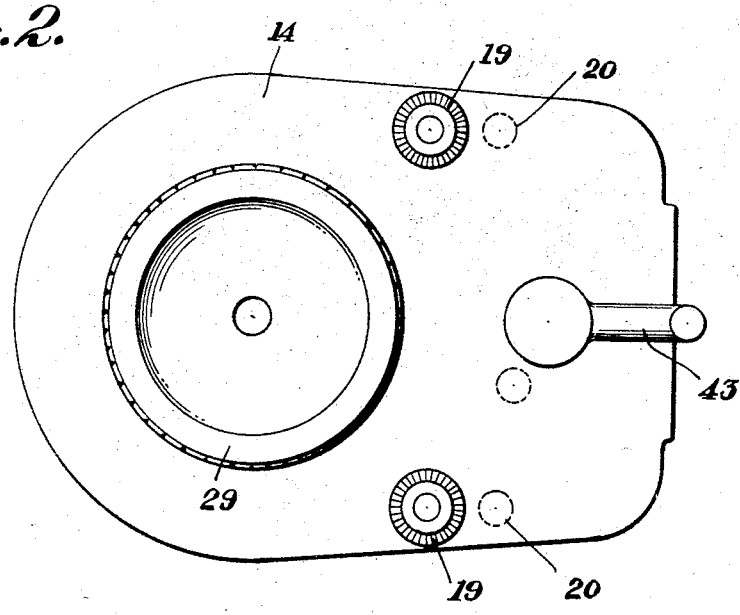
Figure 3:
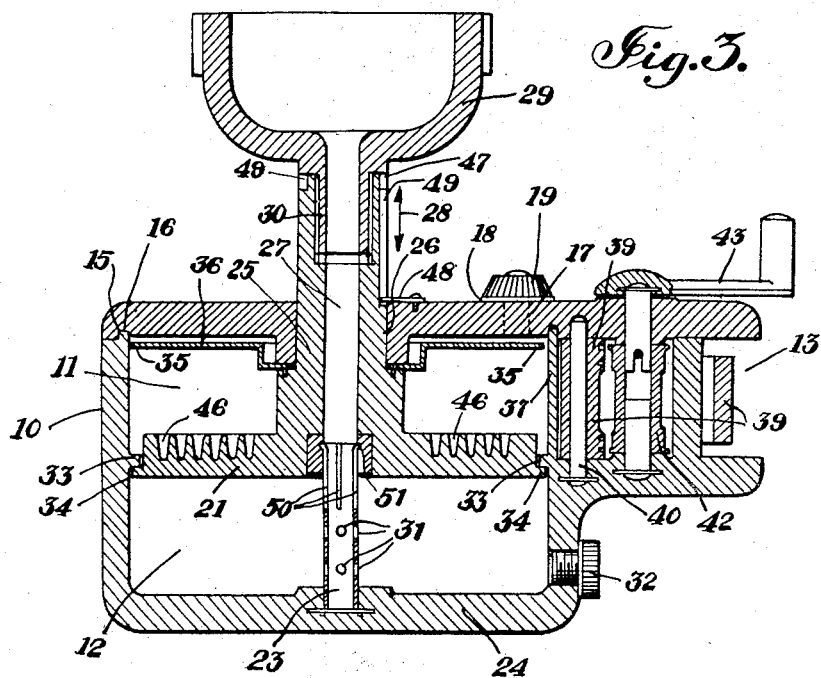
Figure 4:
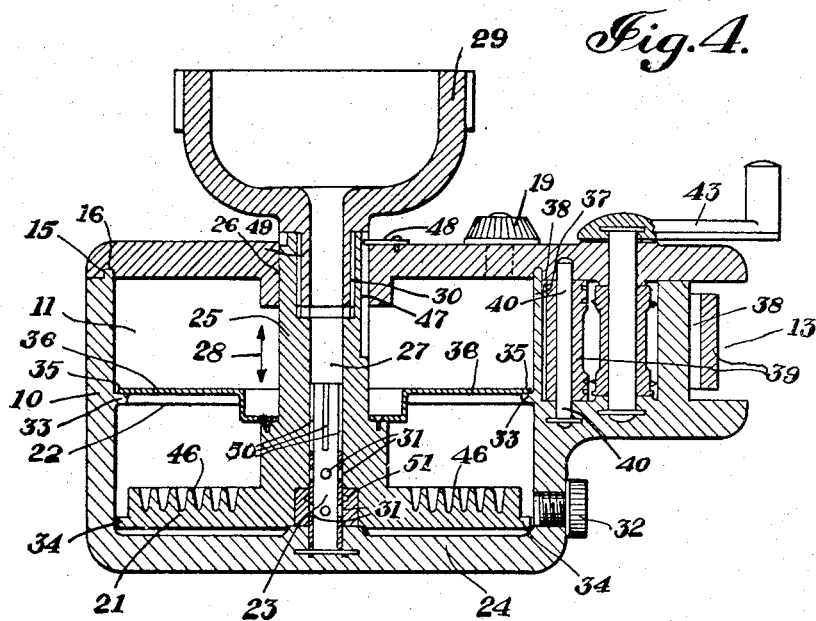

The novel features which I consider characteristic for my invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1 is a top view of my new film developer with the cover removed;

Figure 2 another top view of the same developer with the cover placed on the developer;

Figure 3 a cross section of the developer shown in Figure 2 along line 3—3 of Figure 1, with the film supporting reel in film receiving position; and Figure 4 a cross section of the developer shown in Figure 2 along line 3—3 of Figure 1, with the film supporting reel in film developing position.

As shown in the figures, my new developer consists of a housing 10 provided with three compartments, namely a cylindrical film receiving compartment 11, a co-axially arranged film developing compartment 12 and an open film magazine compartment 13 arranged adjacent to and on the same level with film receiving compartment 11. Housing 10 is closed at its bottom and open at its top and provided with a cover 14 light-tightly closing compartments 11 and 12 and forming the top wall of the open film magazine compartment 13.

The cover opening of housing 10 is encircled by a rib 15 which projects into an annular recess 16 in the bottom of the cover 14 so that light cannot enter compartments 11 and 12 through this opening. To make it possible to lock cover 14 on the housing 10, screws 17 are provided; these screws pass through corresponding holes 18 in cover 14 and enter screw-threaded holes in the side walls of the housing 10. These screws 17 are provided with knob-shaped heads 19 facilitating their handling. To ensure proper positioning of cover 14, locating pins 20 are provided on the cover which engage corresponding holes in housing 10.

In accordance with my present invention, I provide a film supporting reel 21 adapted to slide through opening 22 connecting the compartments 11 and 12. This reel 21 is supported by a tube 23 secured to the bottom 24 of the film developing compartment 12 and reaching into the film receiving compartment 11. Reel 21 is provided with an elongated cylindrical hub 25 reaching through a corresponding opening 26 of cover 14; this hub 25 has a cylindrical bore 27 in which the supporting tube 23 slides so that reel 21 is supported by tube 23 not only rotatably about the same, but also slidably in direction of arrow 28; thus it can be moved through opening 22 from the film receiving compartment 11 into the film developing compartment 12 and back.

A funnel 29 is connected with the upper end of hub 25 by means of screw threading 30 in the manner shown in Figure 3. Furthermore, the supporting tube 23 is provided with openings 31 in that part of the tube which is located in the film developing compartment 12. Through funnel 29, bore 27, tube 23, and openings 31, it is possible to introduce a developer solution into the film developing compartment 12 without the necessity of pouring this solution through the film receiving compartment 11. A plug 32 or similar means may be provided near the bottom 24 of the developing compartment 12 in order to permit removal of the used developer solution after the film has been developed.

In order to prevent leakage of the developer solution from the film developing compartment 12 into the film receiving compartment 11, I provide along the inner wall of housing 10 an annular projecting ring 33 against which the outer edge portion 34 of reel 22 abuts when the reel is in film receiving position, as shown in Figure 3. When the reel is lowered into film developing position, shown in Figure 4, the outer edge portion 35 of reel cover 36 abuts against the upper face of the annular projecting ring 33. In both these positions, the two compartments 11 and 12 are substantially fluid-tightly shut off from each other, preventing leakage of the developer solution from the developing compartment 12 into the receiving compartment 11.

In order to enable introduction of the film to be developed into the film receiving compartment 11, I provide in housing 10, mainly in the cylindrical wall 37 of compartment 11, a film receiving channel 38. This channel is formed on one side by the body of the housing 10 itself and on the other side by a guiding member 39 being pivoted to the housing 10 by means of pivot 40. This guiding member 39 is turnable in direction of arrow 41, thereby enabling widening and narrowing of channel 38 when required. A film transporting sprocket 42, operated by crank 43, is arranged in such a manner as to reach into and form part of that side of the film receiving channel 38 which is formed by the housing itself. In order to introduce a film into channel 38, the guiding member 39 is turned away from sprocket 42, thereby creating a slot wide enough to introduce the film between sprocket 42 and member 39. Thereafter, the guiding member 39 is turned back into operative position shown in Figure 1, holding the film in mesh with the sprocket. In order to hold the guiding member 39 in this operative position near sprocket 42, member 39 is provided with a locating pin 43 reaching into a corresponding hole of cover 14 when the latter is placed in correct position on housing 10.

As shown in Figure 1, the open magazine compartment 13 has a shape corresponding to that of the magazine used and is constructed in such a manner that the outer end 44 of channel 38 is lying opposite a slot in the magazine when the same is placed into compartment 13. The projecting bottom and cover portions of this compartment 13 prevent light from reaching the film while the same is transferred from the magazine through channel 38 into the film receiving compartment 11. This enables use of the developer also in day-light.

My new developer is operated as follows: first, a film magazine is placed into the open film compartment 13 and the leading end of the film to be developed projecting from this magazine is introduced into the film receiving channel 38 between sprocket 42 and guiding member 39. Of course, to make this possible it is necessary to remove the cover 14 so as to enable guiding member 39 to move away from sprocket 42. After the leading end of the film is in mesh with sprocket 42, cover 14 is replaced on housing 10 with the locating pins 20 and 43 in the corresponding holes and secured in this position by screws 17.

Thereafter, sprocket 42 is turned by means of crank 43 until the entire film is transferred from the magazine through channel 38 into the film receiving compartment 11. During this transfer of the film, the film reel 21 is in the position shown in Figure 1, i. e. the outer end 45 of the spiral groove 46 is opposite the inner end of film channel 38, thereby enabling introduction of the film into this spiral groove. This proper positioning of the film reel 21 is obtained by the axial groove 47 in hub 25 which engages the projecting member 48 secured to cover 14. While this projecting member 48 slides in groove 47, the reel is in proper film receiving position.

After transfer of the entire film from the film magazine into the film receiving compartment, the entire film reel 21 together with funnel 29 is lowered into the film developing position shown in Figure 4. In this position, the projecting member 48 reaches into the annular groove 49, thereby enabling rotation of the film supporting reel 21 by turning funnel 29. Before reel 21 is lowered, developing solution is introduced into the developing compartment 12. During lowering of the reel 21, this developing solution pours along the outer edge of the reel over the same, thereby immersing the film to be developed into the solution. Of course, it is also possible to provide holes in reel 21 through which the developing solution passes during lowering of the reel.

After the film is developed, it is possible either to remove the developing solution through plug 32 and thereafter to remove the developed film directly from the developing compartment 12 by opening cover 14, or to leave the developing solution in the developing compartment 12, raise the film supporting reel 21 into the position shown in Figure 3, and thereafter to remove the film from the receiving compartment 11. In this latter case, the same developing solution can be used for consecutive developing of several film strips.

It should be mentioned that the film supporting reel 21 is held in film receiving position shown in Figure 3 by means of the spring action of the upper slotted portion 50 of the supporting tube 23. The upper edge of this tube 23 is bent outward and engages a co-operating groove 51 provided in hub 25. If it is desired to lower reel 21, it is only necessary to force the reel against the spring action of the slotted tube portions 50, thereby pressing these portions inward into bore 27.

It will be understood that each of the elements described above, or two or more together, may also find a useful application in other types of film treating devices differing from the types described above.

While I have illustrated and described the invention as embodied in film developing apparatus, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. In a film developer provided with a film receiving compartment and a film developing compartment in combination, an opening connecting said compartments, a supporting tube secured to the bottom of said film developing compartment and reaching into said film receiving compartment, openings in that part of said supporting tube which is located in said film developing compartment, and a film supporting reel provided with an elongated cylindrical hub reaching through a corresponding opening in the top of said film receiving compartment and having a cylindrical bore in which said supporting tube slides so that said film supporting reel is supported by said supporting tube rotatably about the same and slidably through said opening from one of said compartments into the other and back, said elongated cylindrical hub, said hub bore, said supporting tube, and said openings enabling introduction of a developer fluid into said film developing compartment through said bore, said tube and said openings when said film receiving reel is in said film receiving compartment.

2. A film developer comprising a film developing compartment, a film receiving compartment, a film receiving slot in said film receiving compartment for introducing the exposed film to be developed into said film receiving compartment, said film receiving slot being constructed in such a manner as to prevent light from reaching said film receiving compartment, an opening connecting said compartments, a film supporting reel being rotatable about its axis and being constructed and arranged in such a manner as to be adapted to be moved in direction of said axis through said opening from film receiving position in said film receiving compartment into film developing position in said film developing compartment and back, a spiral groove on said film supporting reel for guiding the exposed film to be developed when the same is introduced through said film receiving slot into said film receiving compartment, and guiding means guiding said film supporting reel during its movement from said film developing compartment into said film receiving compartment in such a manner that in said film receiving compartment it is in non-rotatable position with the outer end of said spiral groove positioned opposite said film receiving slot.

3. A film developer comprising a film developing compartment, a film receiving compartment, a film receiving slot in said film receiving compartment for introducing the exposed film to be developed into said film receiving compartment, said film receiving slot being constructed in such a manner as to prevent light from reaching said film receiving compartment, an opening connecting said compartments, a film supporting reel being rotatable about its axis and being constructed and arranged in such a manner as to be adapted to be moved in direction of said axis through said opening from film receiving position in said film receiving compartment into film developing position in said film developing compartment and back, a spiral groove on said film supporting reel for guiding the exposed film to be developed when the same is introduced through said film receiving slot into said film receiving compartment, guiding means forcing said film supporting reel to be positioned in said film receiving compartment in film receiving position non-rotatably about its axis with the outer end of said spiral groove opposite said film receiving slot, and hand-operated means for sliding said film supporting reel from outside of said compartments in axial direction through said opening from one of said compartments into the other and back, whenever required.

4. A film developer comprising a cylindrical film receiving compartment, a cylindrical film developing compartment, said cylindrical compartments being arranged co-axially superimposed upon each other, a film receiving slot arranged parallel to the common axis of said compartments in said film receiving compartment for introducing the exposed film to be developed into said compartment, an opening connecting said compartments, a film supporting reel being rotatable about said common axis of said compartments and being constructed and arranged in such a manner as to be adapted to be moved in direction of said axis through said opening from one of said compartments into the other and back, a spiral groove on said film supporting reel for guiding the exposed film to be developed when the same is introduced through said film receiving slot into said cylindrical film receiving compartment, guiding means forcing said film supporting reel to be positioned in said film receiving compartment in film receiving position non-rotatably about its axis with the outer end of said spiral groove opposite said film receiving slot, and hand-operated means for sliding said film supporting reel from outside of said compartments in axial direction through said opening from one of said compartments into the other and back, whenever required.

5. A film developer comprising a film developing compartment, a film receiving compartment, a film receiving slot in said film receiving compartment for introducing the exposed film to be developed into said film receiving compartment, said film receiving slot being constructed in such a manner as to prevent light from reaching said film receiving compartment, a film moving sprocket combined with said film receiving slot for pushing said film to be developed through said film receiving slot into said film receiving compartment, an opening connecting said compartments, a film supporting reel being rotatable about its axis and being constructed and arranged in such a manner as to be adapted to be moved in the direction of said axis through said opening from film receiving position in said film receiving compartment into film developing position in said film developing compartment and back, a spiral groove on said film supporting reel for guiding the exposed film to be developed when the same is introduced through said film receiving slot into said film receiving compartment, and guiding means forcing said film supporting reel to be positioned in said film receiving compartment in film receiving position non-rotatably about its axis with the outer end of said spiral groove opposite said film receiving slot.

6. A film developer comprising a film developing compartment, a film receiving compartment, a film receiving slot in said film receiving compartment for introducing the exposed film to be developed into said film receiving compartment, said film receiving slot being constructed in such a manner as to prevent light from reaching said film receiving compartment, a film moving sprocket combined with said film receiving slot for pushing said film to be developed through said film receiving slot into said film receiving compartment, an opening connecting said compartments, a film supporting reel being rotatable about its axis and being constructed and arranged in such a manner as to be adapted to be moved in the direction of said axis through said opening from film receiving position in said film receiving compartment into film developing position in said film developing compartment and back, a spiral groove on said film supporting reel for guiding the exposed film to be developed when the same is introduced through said film receiving slot into said film receiving compartment, guiding means forcing said film supporting reel to be positioned in said film receiving compartment in film receiving position non-rotatably about its axis with the outer end of said spiral groove opposite said film receiving slot, and hand-operated means for sliding said film supporting reel from outside of said compartments in axial direction through said opening from one of said compartments into the other and back, whenever required.

7. A film developer comprising a housing, a closed film receiving compartment in said housing, a closed film developing compartment in said housing, an open film magazine compartment in said housing for the film magazine containing the film to be developed, a film receiving channel connecting said open film magazine compartment with said closed film receiving compartment for introducing said film to be developed from said film magazine positioned in said open film magazine compartment into said closed film receiving compartment, said film receiving channel being constructed in such a manner as to prevent light from passing from said open film magazine compartment through said film receiving channel into said closed film receiving compartment, film transporting means combined with said film receiving channel for pushing said film to be developed from a film magazine positioned in said open film magazine compartment through said film receiving channel into said film receiving compartment, an opening connecting said closed film receiving compartment and said closed film developing compartment, a film supporting reel being rotatable about its axis and being constructed and arranged in such a manner as to be adapted to slide together with said film introduced through said film receiving channel in the direction of said axis through said opening from film receiving position in said closed film receiving compartment into film developing position in said closed film developing compartment and back, a spiral groove on said film supporting reel for guiding the exposed film to be developed when the same is introduced from said open film magazine compartment through said film receiving channel into said closed film receiving compartment, guiding means forcing said film supporting reel to be positioned in said film receiving compartment in film receiving position non-rotatably about its axis with the outer end of said spiral groove opposite said film receiving slot, and hand-operated means for sliding said film supporting reel from outside of said compartments in axial direction through said opening from one of said compartments into the other and back, whenever required.

8. A film developer comprising a housing, a closed cylindrical film receiving compartment in said housing, a closed cylindrical film developing compartment in said housing, said cylindrical film receiving and film developing compartments being arranged co-axially superimposed upon each other, an open film magazine compartment for the film magazine containing the film to be developed, said open film magazine compartment arranged in said housing adjacent to said closed film receiving compartment on the same level with the same, a film receiving channel connecting said open film magazine compartment with said closed film receiving compartment for introducing the film to be developed from the film magazine positioned in said open film magazine compartment into said closed film receiving compartment, said film receiving channel being constructed in such a manner as to prevent light passing from said open film magazine compartment through said film receiving channel into said closed film receiving compartment, a film transporting sprocket arranged in said housing and reaching into said film receiving channel so as to be adapted to move the film to be developed through said channel, hand-operated means for rotating said film transporting sprocket, an opening connecting said closed cylindrical film receiving compartment and said closed cylindrical film developing compartment, a film supporting reel being rotatable about the common axis of said closed cylindrical film receiving and film developing compartments and being constructed and arranged in such a manner as to be adapted to slide together with the film introduced through said film receiving channel in the direction of said axis through said opening from film receiving position in said closed cylindrical film receiving compartment into film developing position in said closed cylindrical film developing compartment and back, a spiral groove on said film supporting reel for guiding the exposed film to be developed when the same is introduced through said film receiving channel into said closed cylindrical film receiving compartment, guiding means forcing said film supporting reel to be positioned in said film receiving compartment in film receiving position non-rotatably about its axis with the outer end of said spiral groove opposite said film receiving slot, and hand-operated means for sliding said film supporting reel from outside of said compartments in axial direction through said opening from one of said compartments into the other and back, whenever required.

9. In a film developer provided with a film receiving compartment and a film developing compartment in combination, an opening connecting said compartments, a cylindrical support secured to the bottom of said film developing compartment and reaching into said film receiving compartment, a film supporting reel provided with an elongated cylindrical hub reaching through a corresponding opening in the top of said film receiving compartment and having a cylindrical bore in which said cylindrical support slides so that said film supporting reel is supported by said cylindrical support rotatably about the same and slidably through said opening from one of said compartments into the other and back, and a fluid conduit formed partly by said cylindrical bore in said cylindrical hub and partly by conduit means associated with said cylindrical support enabling introduction of fluid into said film developing compartment when said film supporting reel is in raised position in said film receiving compartment.

10. A film developer comprising a film receiving compartment, a film developing compartment, an opening connecting said compartments, a film supporting reel being rotatable about its axis and adapted to slide through said opening from one of said compartments into the other and back, said film supporting reel being provided with a closed bottom disk, and closing means on the inner wall of said film developer between said compartments constructed and arranged and co-operating with said film supporting reel in such a manner as to fluid-tightly close said opening when said reel is in film receiving position in said film receiving compartment.

11. A film developer comprising a film receiving compartment, a film developing compartment, an opening connecting said compartments, a film supporting reel being rotatable about its axis and adapted to slide through said opening from one of said compartments into the other and back, said film supporting reel being provided with a closed bottom disk and a closed top disk, and means on the inner wall of said film developer between said film developing compartment and said film receiving compartment constructed and arranged and co-operating with said film supporting reel in such a manner as to fluid-tightly close said opening when said reel is in operative film receiving position in said film receiving compartment as well as when said reel is in operative film developing position in said film developing compartment.

12. A film developer comprising a film receiving compartment, a film developing compartment, an opening connecting said compartments, a film supporting reel being rotatable about its axis and adapted to slide through said opening from one of said compartments into the other and back, a closed bottom plate forming part of said slidable film supporting reel, and a projecting rim surrounding said opening connecting said compartments against which said bottom plate of said slidable film supporting reel abuts when said reel is in film receiving position in said film receiving compartment, thus fluid-tightly closing said opening.

13. A film developer comprising a film receiving compartment, a film developing compartment, an opening connecting said compartments, a film supporting reel being rotatable about its axis and adapted to slide through said opening from one of said compartments into the other and back, a closed bottom plate and a closed top plate forming parts of said slidable film supporting reel, and projecting means surrounding said opening connecting said compartments against which said bottom plate of said slidable film supporting reel abuts when said reel is in film receiving position in said film receiving compartment and against which said top plate of said slidable film supporting reel abuts when said reel is in film developing position in said film developing compartment, thus fluid-tightly closing said opening in both film receiving and film developing positions of said reel.

14. In a film developer provided with a film receiving compartment and a film developing compartment, in combination an opening connecting said compartments, a support in said film developing compartment, a film supporting reel adapted to move from one of said compartments into the other and back, said reel provided with means adapted to engage said support in said film developing compartment during such to and fro movement so that it is permanently supported by said support during its movement between said compartments, and a fluid conduit forming part of said support in said film developing compartment and said support engaging means on said film supporting reel so as to enable introduction of fluid through said fluid conduit into said film developing compartment when said film supporting reel is in said film receiving compartment.

JACQUES BOLSEY.